United States Patent
Paila et al.

(10) Patent No.: US 7,865,161 B2
(45) Date of Patent: Jan. 4, 2011

(54) FILE DELIVERY SESSION HANDLING

(75) Inventors: Toni Paila, New York, NY (US); Topi Pohjolainen, Helsinki (FI)

(73) Assignee: Nokia Corporation, Espoo (FI)

( * ) Notice: Subject to any disclaimer, the term of this patent is extended or adjusted under 35 U.S.C. 154(b) by 759 days.

(21) Appl. No.: 11/628,573

(22) PCT Filed: Jun. 10, 2005

(86) PCT No.: PCT/IB2005/051921

§ 371 (c)(1),
(2), (4) Date: Jul. 30, 2007

(87) PCT Pub. No.: WO2006/000936

PCT Pub. Date: Jan. 5, 2006

(65) Prior Publication Data

US 2007/0281650 A1  Dec. 6, 2007

(30) Foreign Application Priority Data

Jun. 25, 2004  (GB) ................................. 0414334.3
Aug. 18, 2004  (GB) ................................. 0418484.2

(51) Int. Cl.
*H04B 1/06* (2006.01)
(52) U.S. Cl. ..................... 455/231; 455/550.1
(58) Field of Classification Search ................ 455/230, 455/231, 550.1
See application file for complete search history.

(56) References Cited

U.S. PATENT DOCUMENTS

| 5,912,888 | A | 6/1999 | Walsh et al. ................. 370/355 |
| 6,115,393 | A | 9/2000 | Engel et al. ................. 370/469 |
| 6,269,084 | B1 * | 7/2001 | Takei ......................... 370/248 |
| 6,636,519 | B1 | 10/2003 | Walsh et al. ................. 370/401 |
| 7,609,682 | B2 * | 10/2009 | Ang et al. .................... 370/349 |
| 2002/0001302 | A1 | 1/2002 | Pickett ....................... 370/352 |
| 2003/0046396 | A1 * | 3/2003 | Richter et al. ............... 709/226 |

FOREIGN PATENT DOCUMENTS

| EP | 0 654 921 A1 | 5/1995 |
| WO | WO 01/43376 A1 | 6/2001 |
| WO | WO 2004/068263 A2 | 8/2004 |

OTHER PUBLICATIONS

Internet Engineering Task Force, Internet Draft, "FDALC—File Delivery for ALC", T. Paila, Nokia, obtained from http://mirrors.isc.org/pub/www.watersprings.org/pub/id/draft-paila-rmt-fdalc-00.txt, last modified Oct. 2, 2003—see in particular sections 3.1 and 3.2.

* cited by examiner

*Primary Examiner*—Nhan Le
(74) *Attorney, Agent, or Firm*—Harrington & Smith

(57) ABSTRACT

In receiving a file delivery session in which field descriptor tables (FDTs) identify Transport Objects (TOs) transmitted along with the FDTs, a receiver determines whether the files of the session have been received using a number of timers. A fragment wait timer t1 is started for each new TO declared in an FTD when that FDT is received. Each timer is cancelled when at least a fragment of the corresponding TO is received. Alternatively, a single timer is cancelled when at least a fragment of all the TOs have been received. A new object wait timer t3 is started when all the TOs declared in an FDT are received, and is cancelled when a new FDT is received. One of a number of table wait timers t2 is started whenever a TO which is not declared in any received FDT is received, and is cancelled when an FDT declaring that object is received. The file delivery session is left if any timer expires. If following expiry of a timer it is deemed that the file delivery session has almost been received fully, the session is left after a short period of time, so as to allow the session to be fully received.

22 Claims, 7 Drawing Sheets

FILE DELIVERY SESSION HANDLING

FIELD OF THE INVENTION

The invention relates generally to resource delivery over digital communication systems. In particular, the invention relates to a receiver module for receiving data transmitted in a file delivery session, and to a method of handling a file delivery session. The invention relates also to a network node operable in respect of a file delivery session, and to a transmitter operable in respect of a file delivery session.

BACKGROUND OF THE INVENTION

FLUTE is a project managed under the control of the Internet Engineering Task Force (IETF). FLUTE defines a protocol for the unidirectional delivery of files over the Internet. The protocol is particularly suited to multicast networks, although the techniques are similarly applicable for use with unicast addressing. The FLUTE specification builds on Asynchronous Layered Coding (ALC), the base protocol designed for massively scalable multicast distribution. ALC defines transport of arbitrary binary objects, and is laid out in Luby, M., Gemmell, J., Vicisano, L., Rizzo, L. and J. Crowcroft, "Asynchronous Layered Coding (ALC) Protocol Instantiation", RFC 3450, December 2002. For file delivery applications, the mere transport of objects is not enough. The end systems need to know what do the objects actually represent. FLUTE provides a mechanism for signalling and mapping the properties of files to concepts of ALC in a way that allows receivers to assign those parameters for received objects. In FLUTE, 'file' relates to an 'object' as discussed in the above-mentioned ALC paper.

In a FLUTE file delivery session, there is a sender, which sends the session, and a number of receivers, which receive the session. A receiver may join a session at an arbitrary time. The session delivers one or more abstract objects, such as files. The number of files may vary. Any file may be sent using more than one packet. Any packet sent in the session may be lost.

FLUTE has the potential be used for delivery of any file kind and any file size.

FLUTE is applicable to the delivery of files to many hosts, using delivery sessions of several seconds or mote. For instance, FLUTE could be used for the delivery of large software updates to many hosts simultaneously. It could also be used for continuous, but segmented, data such as time-lined text for subtitling, thereby using its layering nature inherited from ALC and LCT to scale the richness of the session to the congestion status of the network. It is also suitable for the basic transport of metadata, for example SDP files which enable user applications to access multimedia sessions. It can be used with radio broadcast systems, as is expected to be particularly used in relation to IPDC (Internet Protocol Datacast) over DVB-H (Digital Video Broadcast-Handheld), for which standards currently are being developed.

FLUTE does not allow a receiver to determine how long it needs to stay on a channel for, in order to fulfil the purpose of the session set by the sender. Thus a receiver cannot know when it has received an entire filecast. FLUTE also does not define the semantics of the session to a receiver. FLUTE uses static and well-defined file delivery sessions, i.e. each file delivery session delivers a fixed set of files, and the files cannot change during the session.

The present invention seeks to overcome these deficiencies, but also has broader applicability in so far as it relates to any file delivery.

SUMMARY OF THE INVENTION

According to a first aspect of the present invention, there is provided a receiver module for receiving data transmitted in a file delivery session, the module comprising one or more of:
 a) a fragment wait timer;
 b) a new object wait timer; and
 c) a table wait timer;
the receiver module being arranged to leave the file delivery session in response to detecting the expiry of any of the one or more timers.

The fragment wait timer may be arranged to be started in response to the receiver module receiving a declaration referring to one or more objects, and arranged to be cancelled in response to the receiver module receiving the whole or at least a part of one of the one or more objects, or alternatively in response to the receiver module receiving the whole or at least a part of all of the one or more objects. In this case, the receiver module may comprise plural fragment wait timers, each fragment wait timer relating to a different one of the objects referred to in the declaration and being arranged to be cancelled in response to the receiver module receiving the whole or at least a part of the associated object.

The new object wait timer may be arranged to be started in response to detecting that all of one or more objects referred to in a declaration received by the receiver module have been received by the receiver module; and arranged to be cancelled in response to the receiver module receiving a further, different declaration.

The table wait timer may be arranged to be started in response to the receiver module receiving an object which is not referred to in any received declaration, and arranged to be cancelled in response to the receiver module receiving a declaration referring to that object. Here, the receiver module may include plural table wait timers, each table wait timer relating to a different object which has been received by the receiver module and which is not referred to in any received declaration, each table wait timer being arranged to be cancelled in response to the receiver module receiving the declaration referring to its associated object.

The or each timer may be arranged to have a duration determined by a corresponding timer parameter. Here, one or more timer parameters may be permanently stored in the receiver module, or alternatively stored in the receiver module in an updatable manner. One or more timer parameters may be received as part of a signal received over a communications network, for instance as part of a data packet.

The receiver module may be arranged to receive packets, for example Internet Protocol packets, containing objects and declarations, and optionally also one or more timer parameters.

The receiver module may be arranged in response to a timer expiring to determine a measure of the completeness of reception of a file delivery session, to compare this to a threshold, and to leave the session approximately immediately or to leave the session after a significant period of time on the basis of the comparison. Here, the significant period of time has a duration equal to less than one half of the expiry time of the timer or the shortest of the timers.

The receiver module may be arranged in response to a timer expiring to estimate a time in which the reception of the file delivery session is expected to be completed, to compare this to a threshold, and to leave the session approximately immediately or to leave the session after a significant period of time on the basis of the comparison.

The invention also provides a portable handheld device including a receiver module as stated above.

According to a second aspect of the invention, there is provided a method of receiving a file delivery session, the method comprising one or more of:

a) starting a fragment wait timer;
b) starting a new object wait timer; and
c) starting a table wait timer;

the method further comprising leaving the file delivery session in response to detecting the expiry of any of the one or more timers.

According to a third aspect of the invention, there is provided a network node operable to provide, in respect of a file delivery session, one or more of a fragment wait timer parameter, a new object wait timer parameter, and a table wait timer parameter for use by a receiver.

According to a fourth aspect of the invention, there is provided a transmitter operable to transmit, in respect of a file delivery session, and optionally along with or forming part of the file delivery session, one or more of a fragment wait timer parameter, a new object wait timer parameter, and a table wait timer parameter for use by a receiver.

Embodiments of the invention will now be described, by way of example only, with reference to the accompanying drawings.

DETAILED DESCRIPTION OF THE PREFERRED EMBODIMENTS

Figure 1:
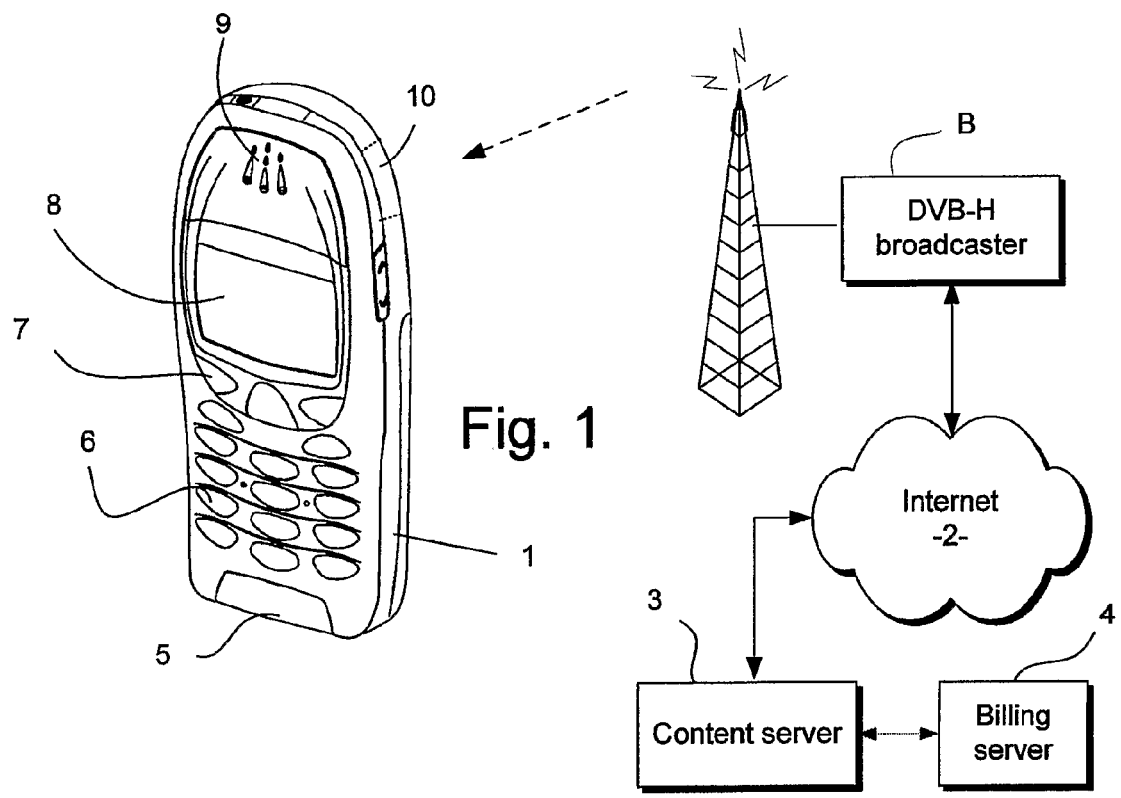
FIG. 1 is a schematic block diagram illustrating a mobile telephone handset which receives data from a server connected through the Internet.

In FIG. 1, a mobile station in the form of a mobile telephone handset 1 receives broadcast data from a DVB-H broadcaster B, which is connected through a network 2, such as the Internet, to a content server 3 that can download data content to the mobile handset 1. The content server 3 has an associated billing server 4 for billing the subscriber for downloaded content.

The handset 1 includes a microphone 5, keypad 6, soft keys 7, a display 8, earpiece 9 and internal antenna 10. The handset 1 is enabled both for voice and data operations. For example, the handset may be configured for use with a GSM network and may be enabled for DVB-H operation, although those skilled in the art will realise other networks and signal communication protocols can be used. Signal processing is carried out under the control of a controller 11. An associated memory 12 comprises a non-volatile, solid state memory of relatively large capacity, in order to store data downloads from the content server 3, such as application programs, video clips, broadcast television services and the like. Electrical analogue audio signals are produced by microphone 5 and amplified by preamplifier 13a. Similarly, analogue audio signals are fed to the earpiece 9 or to an external headset (not shown) through an amplifier 13b. The controller 11 receives instruction signals from the keypad and soft keys 6, 7 and controls operation of the display 8. Information concerning the identity of the user is held on removable smart card 14. This may take the form of a GSM SIM card that contains the usual GSM international mobile subscriber identity and encryption key $K_i$ that is used for encoding the radio transmission in a manner well known per se. Radio signals are transmitted and received by means of the antenna 10 connected through a rf stage 15 to a codec 16 configured to process signals under the control of the controller 11. Thus, in use, for speech, the codec 16 receives analogue signals from microphone amplifier 13a, digitises them into a form suitable for transmission and feeds them to the tf stage 15 for transmission through the antenna 10 to a PLMN (not shown in FIG. 1). Similarly, signals received from the PLMN are fed through the antenna 10 to be demodulated by the rf stage 15 and fed to codec 16 so as to produce analogue signals fed to the amplifier 13band earpiece 9.

The handset can be WAP enabled and capable of receiving data for example, over a GPRS channel at a rate of the order of 40Kbit/sec. It will however be understood that the invention is not restricted to any particular data rate or data transport mechanism and for example WCDMA, CDMA, GPRS, EDGE, WLAN, BT, DVB-T, IPDC, DAB, ISDB-T, ATSC, MMS, TCP/IP, UDP/IP or IP, systems could be used.

The handset 1 is driven by a conventional rechargeable battery 17. The charging condition of the battery is monitored by a battery monitor 18 which can monitor the battery voltage and/or the current delivered by the battery 17.

The handset also includes a DVB-H receiver module 19. This receives broadcast signals from the DVB broadcaster B through a DVB antenna 20.

A user of handset 1 can request the downloading of data content from one or more servers such as server 3, for example to download video clips and the like to be replayed and displayed on the display 8. Such downloaded video clips are stored in the memory 12. Also, other data files of differing sizes may be downloaded and stored in the memory 12. Downloading may be user-initiated, or may be allowed by a user on the basis of a setting of the handset. Alternatively, data downloading may be required by an operator of the network 2, particularly as regards software upgrades.

In FLUTE, a file delivery session has a start time and an end time, and involves one or more channels. One or both of the start and end times can be undefined, that is one or both times may not be known by a receiver. If there are plural channels used in a session, these may be parallel, sequential or a mixture of parallel and sequential. A file delivery session carries files as transport objects. When a transport object is provided with semantics, the object becomes a file. Semantics may include name, location, size and type. Each file delivery session carries zero, one or more transport objects (TOs). Each TO is delivered as one or more packets, encapsulated in the underlying protocol. A particular packet may appear several times per session. A particular TO may be delivered using one channel or using several channels. A TO may be transmitted several times.

A special TO, termed File Delivery Table (FDT), signals mapping of a set of files to TOs. There may be several FDTs. Each different FDT can be called an FDT instance. The contents of different FDT instances may or may not overlap. An FDT instance may be empty. FLUTE provides detailed definition of how FDT instances can be used. The reception and processing of the contents of TOs and FDTs will be understood by those skilled in the art, so is not described here.

In these embodiments of the invention, three parameters are defined. These parameters, or any mix of them, may be used by a receiver to determine whether it should leave a file delivery session. Thus, a receiver may be able to leave a session relatively early whilst it is known with certainty or with a reasonable degree of certainty that all the relevant files of that delivery session have been received. A receiver uses one or more of the three parameters and associated timers, along with knowledge of received packets and received FDTs, to determine whether or not to continue receiving a file delivery session.

Briefly, the three parameters are:

Fragment wait time—this parameter relates to the maximum allowable time between receiving an FDT and receiving at least a first fragment of a TO from that FDT.

New object wait time—this relates to the maximum allowable time between all the TOs for an FDT being received and a different FDT being received.

Table wait time—this relates to the maximum allowable time between receiving a TO not declared in an FDT seen so far and receiving an FDT declaring that TO.

The parameters, which can be for example values in milliseconds, may be signalled to a receiver, in any suitable way. The parameters may instead be hardwired into a receiver on manufacture.

In one embodiment, the parameters are signalled to the handset 1, which is a receiver, by signals broadcast through the DVB-H network B. Alternatively, the parameters are built-into the handset 1 on manufacture. Parameter signalling is advantageous since it can allow flexibility in file delivery sessions, in particular in the times between the transmission of certain components of a session, without requiring a compromise in receiver operation. In either case, the parameters are stored in the handset 1, for example in the memory 12 or in memory forming part of the DVB-H receiver 19.

Figure 3:
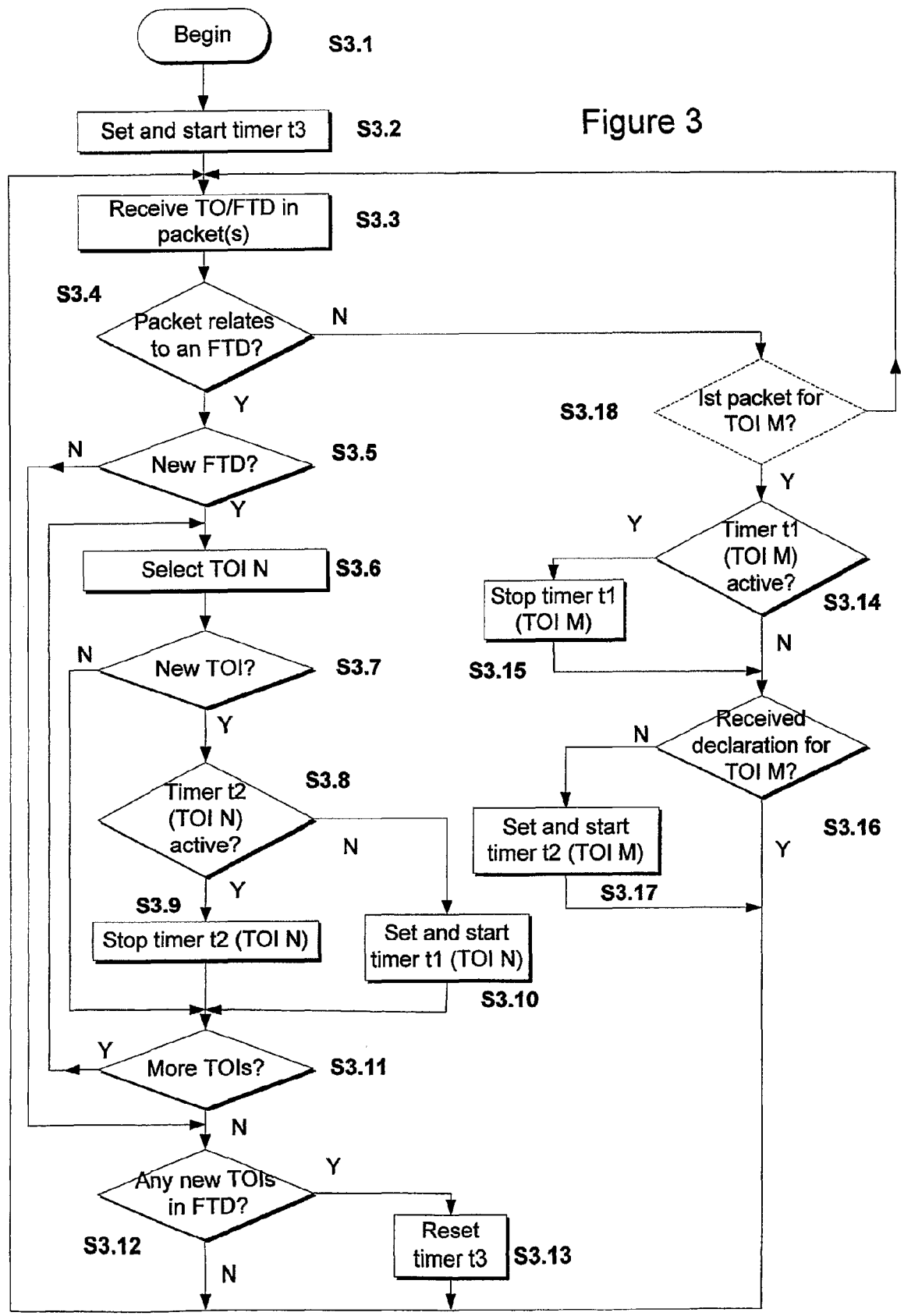
FIGS. 3 and 4 are flowcharts illustrating operation of the FIG. 2 handset in receiving files broadcast as part of a file delivery session.
Figure 4:
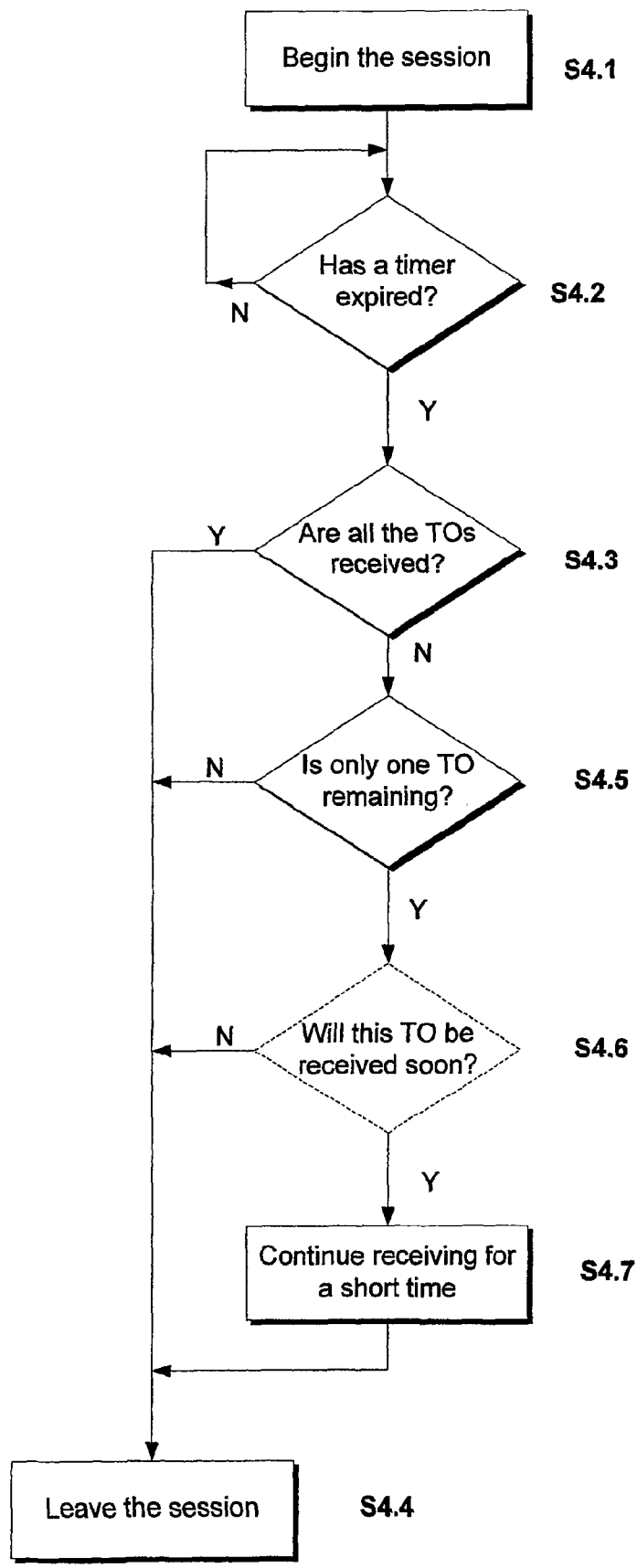

FIGS. 3 and 4 will now be used to describe operation of the handset 1, generally the DVB-H receiver 19 thereof, when it joins a file delivery session. In FIG. 3, operation begins at step S3.1, following which a new objects wait timer t3 is set to have the value of the new objects wait time parameter, and is started at step S3.2. The DVB-H receiver 19 then receives the first TO at step S3.3. In this example, a TO is deemed as having been received when the packet, if there is only one, or all the packets if the TO is spread over multiple packets, is or are received correctly. Two or more packets relating to a single TO may be received sequentially, but it is possible also that one or more packets relating to other TOs may be received in the interim period. When the last packet for a TO is received, that TO is treated as being received for the purposes of step S3.3. At step S3.4, it is determined whether the packet relates to an FDT. If so, operation proceeds to step S3.5.

As step S3.5 it is determined whether the FDT is a new FDT, i.e. whether it is one that has not been received so far in the current file delivery session. If it is a new FDT, a TO Identifier (TOI) is selected from the FDT at step S3.6. Each TO has a corresponding TOI, and no TOI is used for more than one TO. Then, it is determined whether this is a new TOI, i.e. a TOI which has not been included in an FDT received in the current file delivery session, at step S3.7. If it is a new TOI, it is determined at step S3.8 whether a table wait timer t2 (TOI N) for that TOI is active, i.e. whether this timer is counting. There is a separate table wait timer t2 for each TOI. If it is, the table wait timer is stopped at step S3.9. If the table wait timer t2 (TOI N) is not active, a fragment wait timer t1 for that TOI is set to have the fragment wait time parameter and is started at step S3.10. There is a separate fragment wait timer t2 for each TOI. Following step S3.9 or step S3.10, depending on then result of the question of step S3.8, it is determined at step S3.11 whether the FDT includes further TOIs. If there are further TOIs, then operation returns to step S3.6, where a new TOI, i.e. a TOI which has not been processed in the current process, is selected. If step S3.7 reveals at any stage that the TOI being considered is not new, i.e. that it has been received already in the current session, then operation proceeds directly to ask the question of step S3.11, and accordingly steps s3.9, S3.10 and S3.10 then are skipped. If it is revealed at step S3.5 that the FDT is not new, i.e. that it has been received already in the current session, then steps S3.6 to S3.11 are skipped, and operation proceeds instead to step S3.12.

The result of steps S3.5 to S3.10 is that if there is a new TOI in a new FDT, the fragment wait timer t1 for that TOI is set and started if the table wait timer t2 for that TOI is not active, and the table wait timer t2 for that TOI is stopped if it is active. The process checks all the new TOIs in the FDT, and either sets and starts a fragment wait timer t1 or stops a table wait timer t2 for each TOI, as appropriate.

Immediately following step S3.11, or immediately following a negative determination from step S3.5, it is determined at step S3.12 whether the received FDT includes any new TOIs, i.e. includes any TOIs relating to TOs which have not so far been received in the current session. If there is a positive determination, i.e. it is found that FDT includes one or more TOIs relating to TOs which have not so far been received in the current session, then the new object wait timer t3 is reset and restarted at step S3.13. Following this step or following a negative determination from step S3.12, the operation returns to step S3.3, where a new TO or FDT begins being processed.

If at step S3.4 it is determined that a received TO does not relate to an FDT, it is assumed that the TO relates to a file, and operation proceeds to step S3.14. Here, it is determined whether the fragment wait timer t1 for the TOI of the TO is active. If it is, the fragment wait timer t1 is stopped at step S3.15. Since the fragment wait timer t1 for a given TOI is active only if set at step S3.10, the timer being active indicates that a new FDT has been received. Since the fragment wait timer t1 is stopped at step S3.15 if it is found to be active at step S3.14, the result is that the fragment wait timer t1 for a given TOI expires if the corresponding TO is not received within the time set by the fragment wait time parameter. The timer is cancelled so does not expire if the TO is received within the time set by the fragment wait time parameter. Thus, the receiver will wait only for a time determined by the fragment wait time parameter for each TO of an FDT to be received before leaving the file delivery session if those TOs are not received.

Following steps S3.14 and S3.15, operation proceeds to step S3.16. Here it is determined whether a declaration has been received for the TOI, i.e. it is determined whether an FDT including the TOI has been received in the current session. If a negative determination is made, at step S3.17 the table wait timer t2 for that TOI is set to have a value determined by the table wait time parameter, and then the timer is started. The effect of this is that the table wait timer t2 for a TOI is started when the TO is received and the TOI has not been declared. This timer t2 is cancelled at step S3.9 if the TOI is declared before the table wait timer t2 expires. If it is not received, the table wait timer expires.

Following steps S3.16 and S3.17, operation returns to step S3.3, where another TO is received for processing.

The new object wait timer t3 and the fragment wait and table wait timers t1, t2 for each TOI may be implemented in any suitable manner, for example using discrete timers (not shown), or using subroutines implemented on the controller 11 or on a processor (not shown) included in the DVB-H receiver 19.

All will be appreciated from analysis of the flowchart of FIG. 3, the table wait timer t2 for a given TOI is active only if the DVB-H receiver 19 is waiting for an FDT, which occurs only if a TO is received and this TO is not identified in an FDT received during the current session. In this case, the DVB-H receiver 19 expects to receive an FDT, or at least an FDT different to any received so far, and the use of the table wait timer t2 causes the DVB-H receiver to wait a predetermined amount of time, equal to that indicated by the table wait time parameter, for that table to be received. If an appropriate FDT, i.e. one which includes a TOI for that TO, is not received before the table wait timer t2 for that TOI counts down to zero, the DVB-H receiver 19 leaves the session.

Although in the above, a TO is deemed as having been received at step S3.3 when all the packets of a TO spread over multiple packets are received correctly, the operation may instead be carried out in respect of individual packets even if all the packets which make up a TO have not yet been received. In this case, step S3.3 relates to the receiving of a single packet, and a step S3.18 is interposed immediately before step S3.14. In step S3.18, it is determined if the packet is the first packet received in respect of a TO. If a positive determination is made, then the operation proceeds to step S3.14. Otherwise, the operation ignores the packet, and returns to step S3.3. This step results in a fragment wait timer t1 for that TO being stopped if any fragment of the TO has been received.

An alternative will now be described. Instead of providing step S3.13 depending from the question of step S3.12, step S3.12 can be omitted entirely, and the step S3.13 can be interposed instead after the positive determination branch of step S3.7. For example, step S3.13 could be placed directly after step S3.7, or directly before step S3.11. The effect of this alternative is the same as that embodiment described above, although this alternative involves one fewer determination, since step S3.12 can be omitted.

Figure 2:
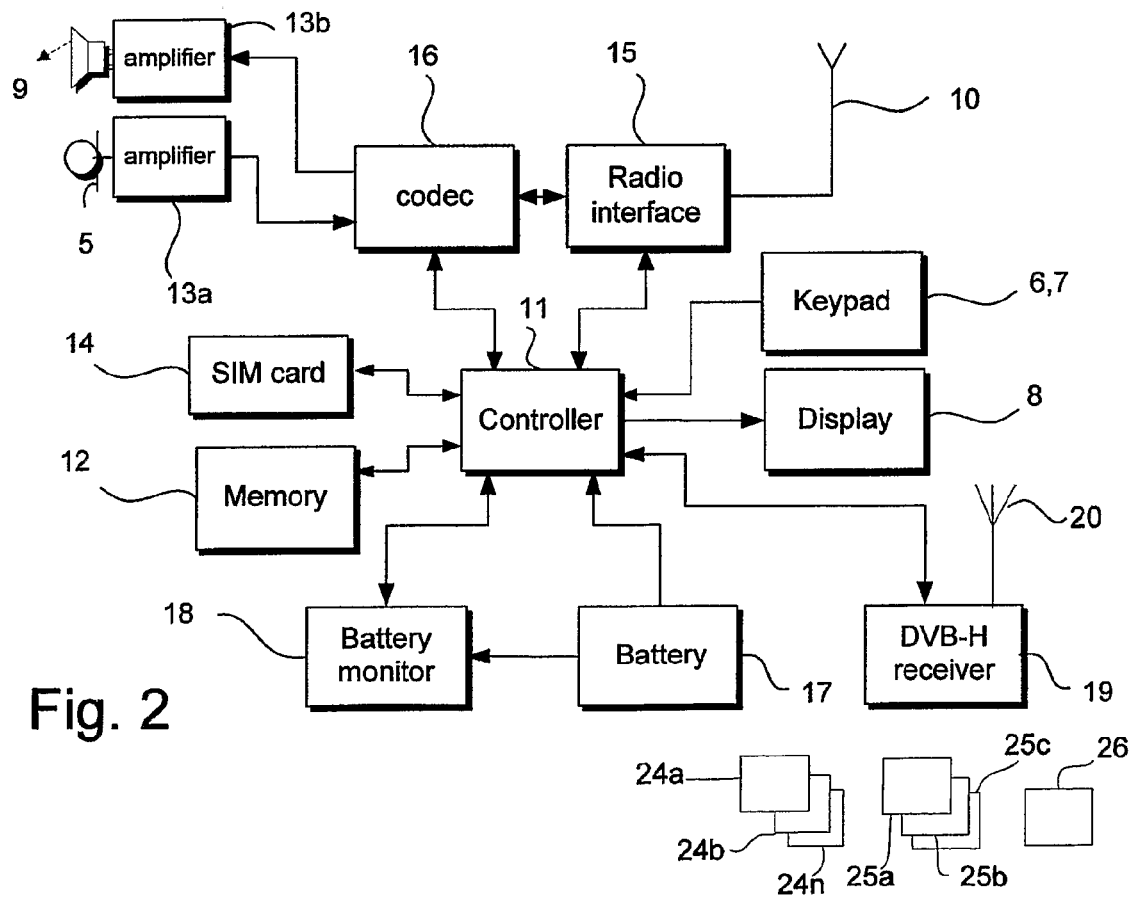
FIG. 2 is a schematic block diagram of the circuitry of the mobile handset shown in FIG. 1.

The fragment wait timers are illustrated at 24a, 24b...24n in FIG. 2. The table wait timers are illustrated at 25a, 25b... 25c. The new object wait timer is illustrated at 26.

Operation of the handset 1, and the DVB-H receiver 19, in relation to the fragment wait timers t1, the new object wait timer t3 and the table wait timers t2 is now described with reference to FIG. 4. This operation is performed in parallel to the operation of FIG. 3. This may be effected through the use of separate hardware, or alternatively through the use of subroutines and suitable operating system software.

Referring to FIG. 4, whilst a session is in progress i.e. a session is being received, which is denoted by a begin the session step S4.1, the operation stays in a loop at step S4.2 until it is determined that a timer has expired. Step S4.2 provides a positive determination, and thus causes progression to step S4.3, if any one of the fragment wait timers t1, the new object wait timer t3 and the table wait timers t2 expires, i.e. counts down to zero. Of course, the counters may instead count up, from zero or another value, to a predetermined value.

Step S4.2 can be carried out in any suitable way. It is not necessary that there is notification immediately on a timer expiring, as long as each timer is examined sufficiently frequently that there cannot be an excessive delay between a timer expiring and the operation of FIG. 4 moving onto step S4.3.

At step S4.3, it is determined whether all the TOs identified by corresponding TOIs in the FDTs received during the current session have been received. If a positive determination is made, it is determined that the file delivery session has completed successfully, in so far as the handset 1 has received all the files intended to be delivered by the session, and the session is left at step S4.4. Leaving the session will be understood to comprise ceasing receiving packets for the session. In most cases, this involves the switching off at least some of the receiver functions of the DVB-H receiver 19, although it may remain switched on to receive other broadcast data. Once the session has been left, the power consumption of the handset can be reduced considerably, thereby extending the time before which the battery 17 win require recharging.

The handset 1 includes means for avoiding a session being left when the file delivery process is nearly complete. In this example, if a negative determination is made at step S4.3, operation proceeds to step S4.5. Here, it is determined whether there is only one TO remaining to be received, i.e. whether all but of the TOs identified in the FDT or FDTs of the session have been received. This in effect is a determination that the file delivery process is nearly complete, but it will be appreciated that other schemes may be used instead. For example, a number of not-received packets, or not-received TOs, where the number is greater than one, may be used as an alternative threshold. If it is determined that the file delivery process is not nearly complete, the session is left at step S4.4.

Following a positive determination at step S4.5, operation proceeds to the optional step S4.6. This is optional since it may be omitted entirely. At step S4.6 it is determined whether the file delivery process will be completed soon, in this example by determining whether the one missing or incomplete TO will be received or completed within a short, predetermined, period of time. This can be carried out in any suitable manner. For example, it may be possible to predict the amount of time needed to complete packet reception if the packet currently is being received at a steady rate and the length of the packet is known. The time to completion of the reception of a file delivery session may be calculated or estimated using any knowledge of packet transmission timing or scheduling (for example where the packets are repeatedly transmitted, from a carousel or the like), any calculation of average or recent data receiving rate and/or amount of data remaining to be received. If forward error correction data, for example Reed Solomon data, forms part of a TO, zero padding may be determined not to be required by the DVB-H receiver 19. Also in this case, not all the application data and/or the parity data need be received, because the parity data can correct errors in the application data and because the parity data is needed only if there are errors in the application data.

The time that constitutes a small amount of time may be determined in any suitable way. It may be predetermined. It may be dependent on the amount of charge remaining in the battery 17. In particular, the amount of time may be greater if there is detected to be a relatively high charge level in the battery 17, and may be less if the is not much charge in the battery. The battery charge level can be determined in any suitable manner.

If step S4.6 provides a positive determination, the session continues for a short time, for example the predetermined time used as a threshold in the step S4.6, by virtue of step S4.7, before the receiver 19 leaves the session at S4.4. A separate timer may be used to implement step S4.7

If one of steps 4.5 and 4.6 provides a negative determination, the session is left at step S4.4 without all the files having been received. The same applies if all the files are not received following step S4.7. In any of these cases, an error message may be provided, for example on the display 8. The DVB-H receiver may infer from this that the file delivery session was of an unsupported session type.

The system can be allowed to flush before leaving the session by waiting until the next scheduled link layer multiplex slot (i.e. time slice burst for DVB-H) or a whole cycle of slots (which takes a maximum of 41 seconds for DVB-H) after the timer expiry.

The operation of steps S3.3 to S18 of FIG. 3 can be implemented in software, for example by being based on the following pseudocode, which is self-explanatory.

Receive packet P with TOI M from the session

```
If the packet P carries a part of or a complete FDT instance {
    If after the reception an FDT instance was received completely {
        If the completely received FDT instance is a "new" FDT instance {
            For each TOI N in the received FDT instance do {
                If N is a "new" TOI declaration {
                    If table_wait_timer(N) active {
                        Stop table_wait_timer(N)
                    } else {
                        Set fragment_wait_timer(N);
                        Start fragment_wait_timer(N)
                    }
                }
            }
            If there was any "new" TOI declaration in the FDT instance {
                Reset global_new_table_wait_timer;
            }
        }
    } else {
        If this is the first packet seen/received by the receiver for TOI M {
            If the fragment_wait_timer(M) is active {
                Stop fragment_wait_timer(M)
            }
            If the receiver has not seen/received declaration for TOI M {
                Set table_wait_timer(M);
                Start table_wait_timer(M)
            }
        }
    }
}
```

Repeat for next packet P.

An alternative to this follows. Instead of placing the command "reset global_new_table_wait_timer" as shown, the same effect can be achieved by placing the command instead after the "If N is a "new" TOI declaration" determination, i.e. as a command in sequence with the "If table_wait_timer(N) active" determination step. This then has the same effect as one of the alternatives to the FIG. 3 operation described above.

The operation of the DVB-H receiver 19 can be summarised as follows. In receiving a file delivery session in which field descriptor tables FDTs identify TOs transmitted along with the FDTs, the receiver 19 determines whether the files of the session have been received using a number of timers. A fragment wait timer t1 is started for each new TO declared in an FTD when that FDT is received. Each timer is cancelled when at least a fragment of the corresponding TO is received. Alternatively, a single timer is cancelled when all the TOs have been received. A new object wait timer t3 is started when all the TOs declared in an FDT are received, and is cancelled when a new FDT is received. One of a number of table wait timers t2 is started whenever a TO which is not declared in any received EDT is received, and is cancelled when an FDT declaring that object is received. The file delivery session is left if any timer expires. If following expiry of a timer it is deemed that the file delivery session has almost been received fully, the session is left after a short period of time, so as to allow the session to be fully received.

The operations of FIGS. 3 and 4 provide support for dynamic filecast sessions, i.e. sessions in which the files, and thus the TOs, can change over the session. In particular, it is step S3.12 which is instrumental in providing this.

Figure 5:
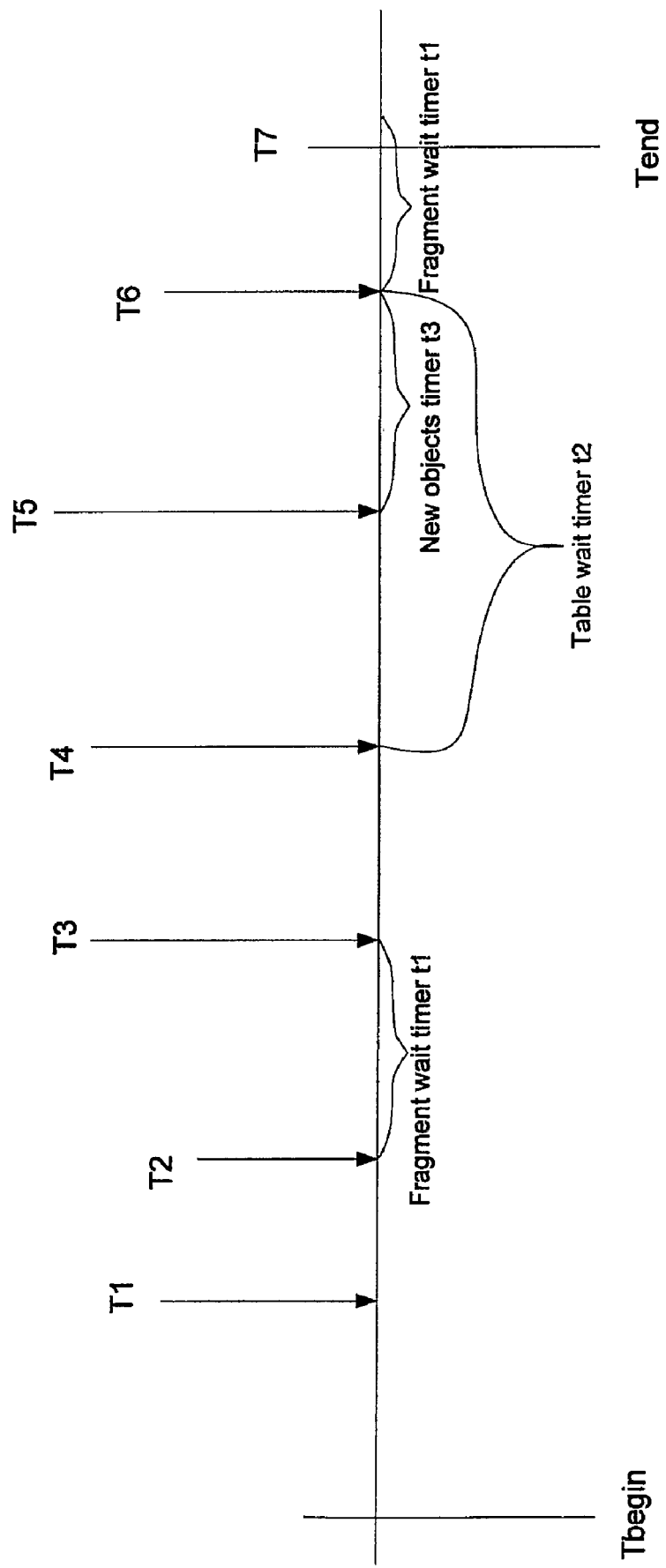
FIG. 5 is a timeline chart illustrating operation of the FIG. 2 handset in relation to a specific example.

Application of the operation of FIG. 3 to an expected file delivery session scenario will now be described with reference to FIG. 5. In FIG. 5, a timeline illustrating operation of the DVB-H receiver 19 of the handset 1 during reception of a file delivery session is shown, advancing rightwards with time. The session begins at Tbegin, and ends at Tend.

At time T1, the DVB-H receiver 19 joins the file delivery session.

At time T2, the receiver 19 receives an instance A of an FDT table (FDT A). This table associates objects with their semantics (such as name, size, media type, etc.). In this example, FDT A declares transport objects x, y, and may declare some other transport objects aswell. This is the first instance of an FDT table that the receiver 19 sees. The receiver sets a fragment wait timer t1 for each TOI in the FDT with a value equal to the fragment wait time parameter. These timers are then started.

Between time T1 and time T3, the receiver 19 receives some packets. Some of these packets belong to TOs declared in FDT A. The receiver 19 stops the fragment wait timer t1 for TOs declared in FDT A as the first fragment of that TO is received. In this example, a fragment from each of the declared TOs is received, but otherwise the session would be left.

At time T4, the receiver 19 receives a packet belonging to a transport object "z" not yet declared in any table instance seen so far. The receiver 19 then sets a table wait timer t2 for that to with the value of the table wait parameter, and starts the timer.

By time T5, the receiver 19 has received all the files declared in instances of FDT tables seen so far. Although by T3 at least one fragment from each TO had been received, by time T5 all the fragments for each TO have been received. The receiver 19 here sets the object wait timer t3 with a value equal to the new objects wait parameter, and starts the timer.

At time T6, the receiver 19 receives an instance B of an FDT table (FDT B). In this example, the FDT B is different to FDT A, and declares TOs w, v and possibly some other TOs. If any TO declared in FDT B is a TO that is not declared in any previous instance of an FDT table, namely FDT A, the receiver stops (and optionally also resets) the table wait timer t2 fir these TOs (see step S3.8 of FIG. 3). Further, if FDT B declares the transport object "z" the receiver 19 stops (and optionally also resets) the object wait timer t3 (see step S3.13).

The file delivery session has a defined end time, Tend, which in this example is known by the receiver 19. In this case, when the receiver 19 reaches the end time of the file delivery session Tend, it leaves the file delivery session.

Figure 6:
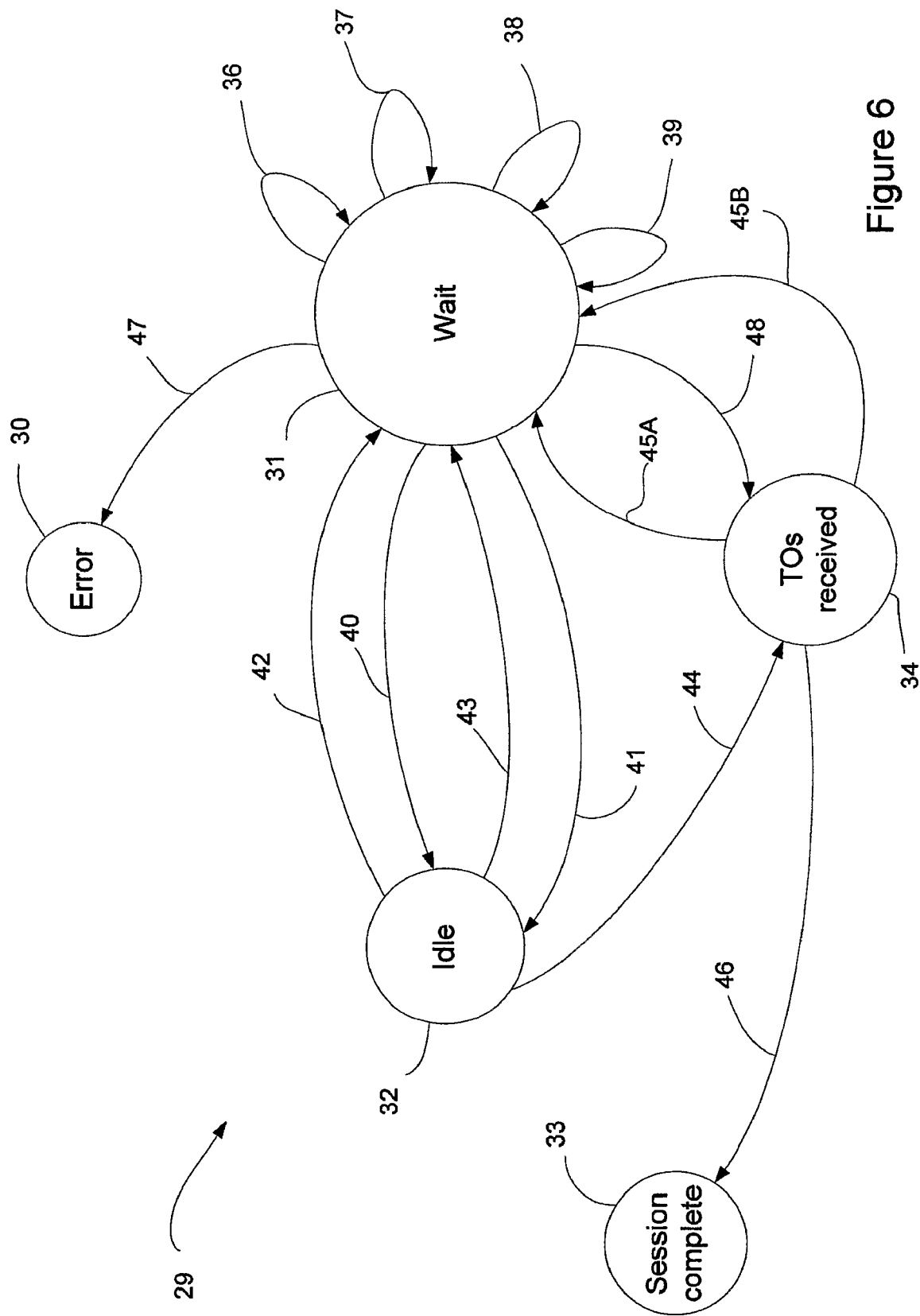
FIGS. 6 to 8 are state-machine representations of operation of the FIG. 2 handset.

The state machine 29 of FIG. 6 includes first to fifth states 30 to 34. In the second state 31, the receiver is waiting for a TOI, or for a declaration of a TOI. In the third state 32, the receiver is idle. In the fifth state 34, all the declared objects have been fully received. The session may be left in the first state 30, which is an in error state or in the fourth state 33, which indicates that a session is complete.

There are a number of events which can trigger transition from the wait state 31. A first transition 36 is triggered when an FDT that contains one or more new TOIs, that is TOIs that have not been previously declared, is received. This triggers the setting and starting of a fragment wait timer t1 for each of the new TOIs. The transition 36 is to the wait state 31. A second transition 37 is triggered in response to the event of receiving a packet for a TOI that has an active fragment wait timer t1. The response is to stop the fragment weight timer t1 for that TOI. This transition 37 can occur only if there still are one or more active fragment wait timers t1. The transition 37 returns to the wait state 31. A third transition 38 is triggered by the event of receiving an FDT that contains a declaration for a TOI that has an active table wait timer t2. This can occur only if there are still one or more active table wait timers t2. On the transition 38 the active wait table t2 for that TOI is stopped. The third transition 38 is to the wait state 31. A fourth transition 39 is triggered by the event of receiving a first packet for a TOI, which is not an FDT table. This triggers the starting of a table wait timer t2 for that TOI. The transition is to the wait state 31.

A transition 40 is made from the wait state 31 to the idle state 32 in response to the event of receiving a packet for a TOI that has an active fragment wait timer t1. The fragment wait timer t1 for that TOI is stopped. A sixth transition 41 is triggered by the event of receiving an FDT that contains a declaration for a TOI that has an active table wait timer t2. The table wait timer for that TOI is stopped as a consequence of this transition 41. The sixth transition 41 is from the wait state 31 to the idle state 32.

When in the idle state 32, there are three possible transitions. A first transition 42, is in response to the event of receiving a FDT that contains one or more new TOIs. This triggers a fragment wait timer t1 to be set and start for each of those new TOIs. The transition is from the idle state 32 to the wait state 31. Another transition 43 from the idle state 32 to the wait state 31 occurs in response to the receiving a first packet for a TOI which is not an FDT table. This triggers the starting of a table wait timer t2 for that TOI. The third transition from the idle state 32 is to the objects received state 34. This transition is labelled 44 in the Figure. This transition 44 occurs when the last missing file fragment is received. This triggers the resetting and starting of the object wait timer t3.

When in the TOs received state 34, three transitions are possible. A first transition 45A is to the wait state 31, and occurs when an FDT which contains one or more new TOIs is received. This triggers the setting and starting of a fragment wait timer t1 for each of the new TOIs. Optionally, this transition 45A may cause the object wait timer t3 to be stopped. A second transition 45B is to the wait state 31. This transition 45B occurs when a packet is received with a TOI that has not been declared in any FDT instance received so fat. Transition 45B triggers the setting and starting of a table wait timer t2 for the received new TOIs. Optionally, this transition 45B may cause the object wait timer t3 to be stopped. A third transition 46 is from the TOs received state 34 to the session complete state 33. This transition 46 occurs when the object wait timer t3 expires.

A transition from the wait state 31 to the error state 30 occurs when any of the fragment wait timers t1 or the table wait timers t2 for any TOIs expires. This transition is labelled 47 in the Figure. A transition 48 from the wait state 31 to the TOs received state 34 occurs when the last missing file fragment is received. This resets and starts the object wait timer t3.

Figure 7:
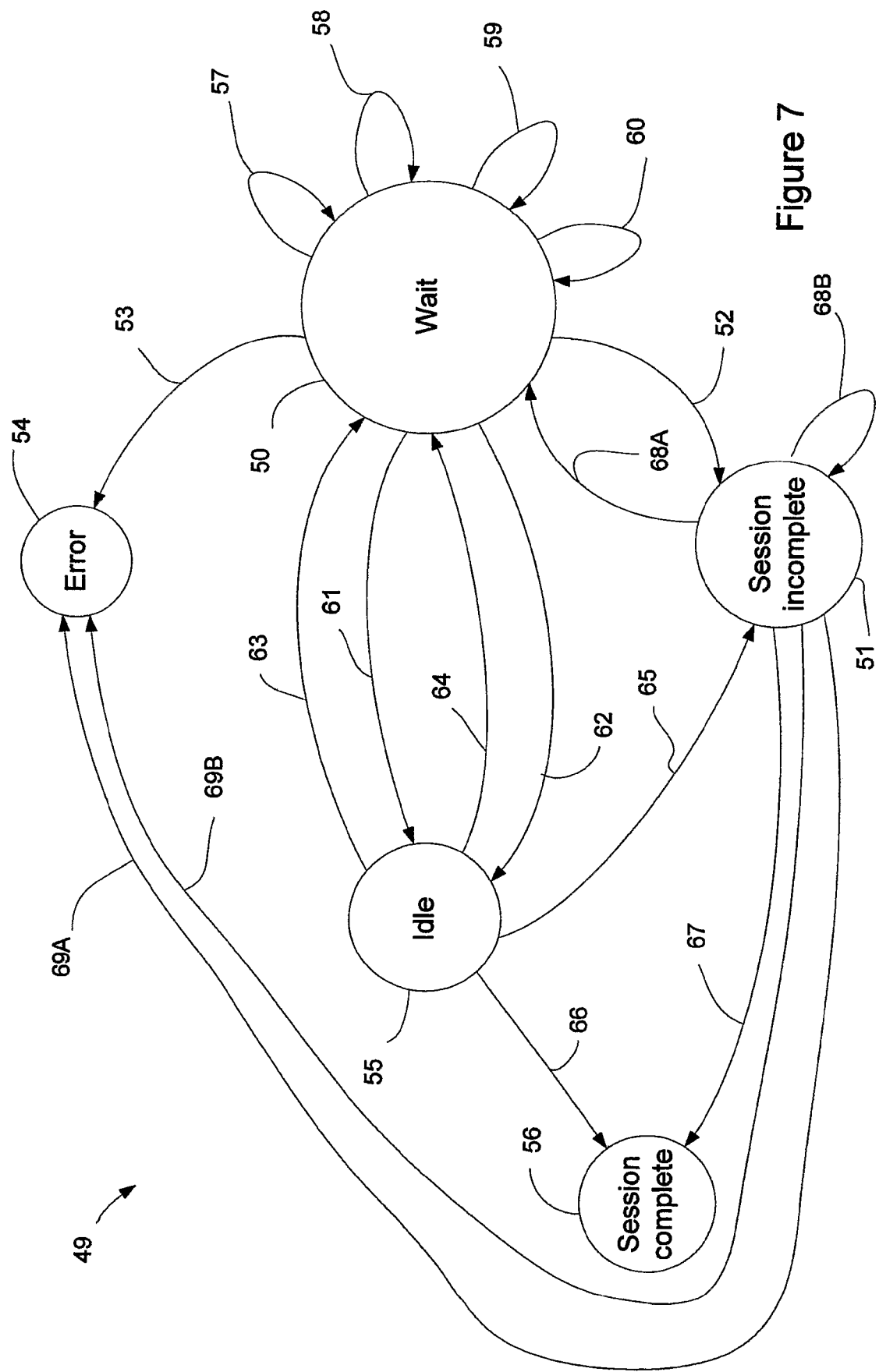

An alternative state machine 49 will now be described with reference to FIG. 7. In this state machine, a wait state 50 relates to a state in which a TOI or a declaration of a TOI is being waited for. A session incomplete state 51 is provided. This is transitioned to from the wait state 50 by a transition 52, which occurs in response to the object wait timer t3 expiring. This occurs only if one or more declared objects have not yet been received. A transition 53 is made from the wait state 50 to an error state 54 in response to any fragment wait timer t1 or any table wait timer t2 for any TOI expiring. Further present are an idle state 55 and a session complete state 56.

A transition 57 is made from the wait state 50 to itself in response to the event of receiving an FDT that contains a new TOI, i.e. a TOI which has not been previously declared. Actions resulting from the transition 57 are the starting and setting of a fragment wait timer t1 for each new TOI declared in the FDT, and the resetting of the object wait timer t3. A second transition 58 from the wait state to itself occurs in response to the event of receiving a packet for a TOI that has an active fragment wait timer t1. This causes the fragment wait timer t1 for that TOI to be stopped. This occurs only if there are one or more active fragment wait timers t1. A third transition 59 from the wait state 50 to itself occurs in response to the event of receiving an FDT that contains a declaration for a TOI that has an active table wait timer t2. The result of this is that the table wait time t2 for that TOI is stopped. This occurs only if there are one or more active table wait timers t2. A fourth transition 60 from the wait state 50 to itself occurs when the first packet for a TOI which is not an FDT table is received. This causes a table wait timer t2 for that TOI to be started.

A transition 61 is made from the wait state 50 to the idle state 55 when a packet for a TOI that has an active fragment wait timer t1 is received. This results in the fragment wait timer t1 for that TOI being stopped. A further transition 62 from the wait state 50 to the idle state 55 occurs when an FDT that contains a declaration for a TOI that has an active table wait timer t2 is received. The consequence of this is that the table wait timer t2 for that TOI is stopped.

A transition 63 from the idle state 55 to the wait state 50 is made in response to the event of receiving an FDT that contains one or more new TOIs. On making the transition 63, a fragment wait timer t1 for each new TOI is set and started, and the object wait timer t3 is reset. A further transition 64 from the idle state 55 to the wait state 50 occurs when a first packet for a TOI which is not an FDT table is received. This causes a table wait timer t2 for that TOI to be started.

A transition 65 from the idle state 55 to the session incomplete state 51 occurs when the object wait timer t3 expires. This occurs only if one or more declared objects have not yet been received. If in idle state 55 the object wait timer t3 expires and all declared objects have been received, a transition 66 is made instead to the session complete state 56.

Whilst in the session incomplete state 51, five transitions are possible. Firstly, in response to the event of receiving a packet which is missing for a declared TOI, and on the condition that all the declared objects have been received, a transition 67 to the session complete state 56 is made.

In response to the event of receiving a first packet for an undeclared TOI which is not an FDT, two alternative transitions are possible, which constitute two different embodiments. The first alternative is transition 68A from the session incomplete state 51 to the wait state 50. This transition 68A causes a table wait timer t2 for the TOI to be started. The provision of the transition 68A allows the file set that has been received so far to be supplemented with files that have not yet been encountered. Alternatively, transition 68B from the session incomplete state 51 to itself is more strict, and allows only files which have been encountered to be completed. This transition does not cause any timers to be altered.

A fourth transition 69A occurs in response to the event of receiving a FDT that contains one or more new TOIs. The transition 69A is from the session incomplete state 51 to the error state 54. This provides the session with a well-defined time window within which the receiver can complete the retrieval of files which may be incomplete, whilst providing some certainty that the set of files in the session is not being altered. This is particularly advantageous in applications that use unreliable underlying transport when the sender wants to be ensure that there are enough re-transmissions for any receiver to complete the retrieval of the session contents. A fifth transition 69B from the session incomplete state 51 to the error state 54 occurs when a fourth timer t4 expires. The timer t4 is reset and started whenever the session incomplete state 51 is entered, and stopped whenever the state is exited. The timer t4 is included to ensure that the session incomplete state is not occupied indefinitely.

There may also be other transitions (not shown) from the session incomplete state 51 to the error state 54.

Figure 8:
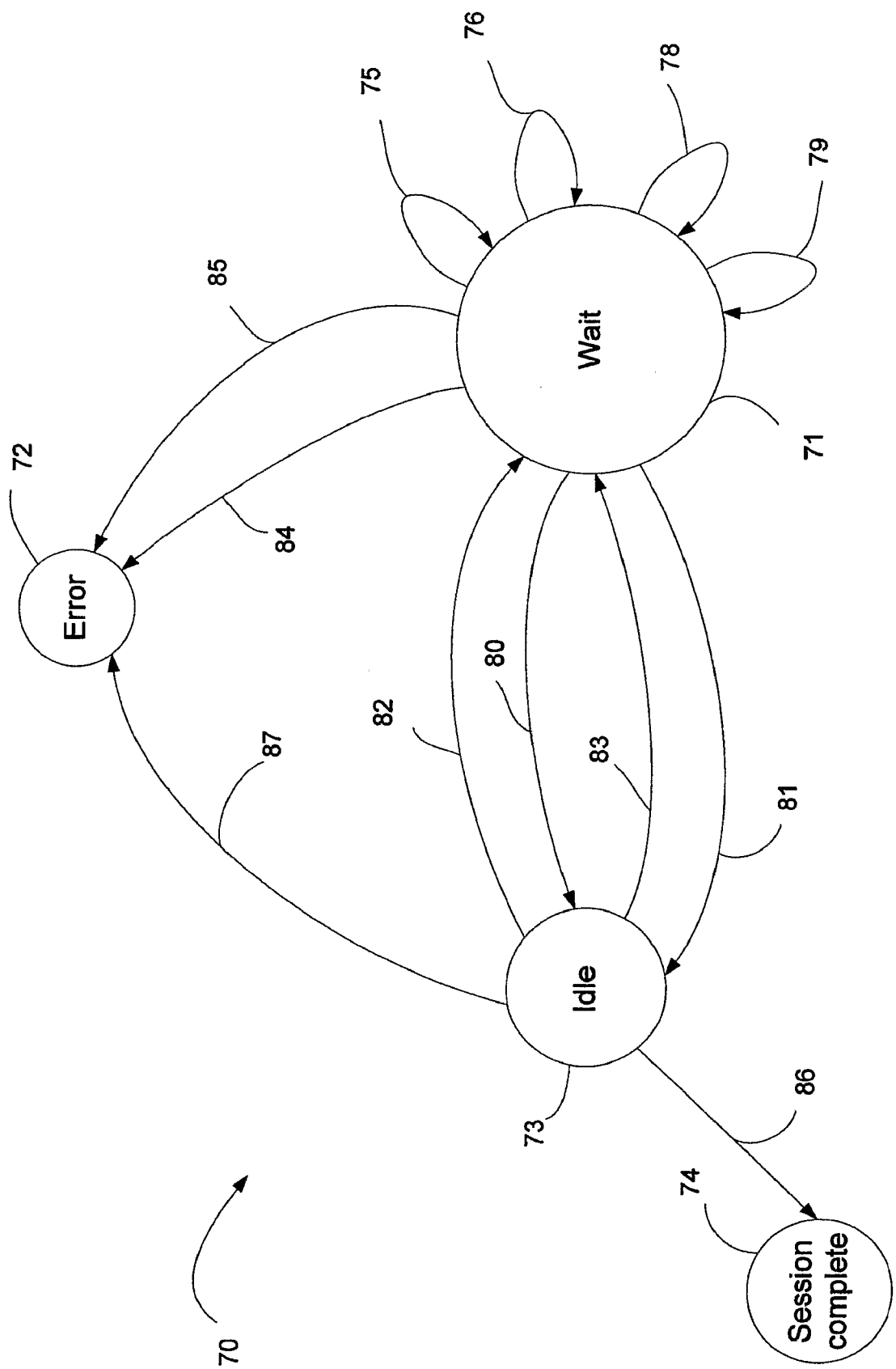

An alternative state machine 70 is shown in FIG. 8. The state machine 70 includes a wait state 71. In the wait state, the state machine 70 is waiting for a TOI or for a declaration of a TOI. Other states in the state machine 70 are an error state 72, an idle state 73 and a session complete state 74.

When in the wait state 71, the state machine 70 may undergo a transition 75 back to the wait state 71. The transition 75 is made in response to the event of receiving an FDT that contains one or more new TOIs. This transition 75 triggers the setting and starting of a fragment wait timer t1 for each new TOI. It also triggers the resetting of the object wait timer t3. A further transition 76 from the wait state 71 to itself occurs when a packet for a TOI that has an active fragment wait timer t1 is received. This causes the stopping of the fragment wait timer for that TOI. This occurs only if there are one or more active wait timers t1. A third transition 78 from the wait state 71 to itself occurs when an FDT that contains a declaration for a TOI that has an active table wait timer t2 is received. This occurs only when there are one or more active table wait timers t2. The table wait timer t2 for each TOI which is included in the received FDT is stopped. A fourth transition 79 from the wait state 71 to itself occurs when a first packet for a TOI which is not an FDT table is received. This triggers the starting of a table wait timer t2 for that TOI.

If in the wait state 71, a transition 80 to the idle state 73 is triggered by the event of receiving a packet for a TOI that has an active fragment wait timer t1. Transition 80 triggers the stopping of the fragment wait timer for that TOI. A further transition 81 from the wait state 71 to the idle state 73 occurs in response to an FDT that contains a declaration for a TOI that has an active table wait timer t2 being received. The table wait timer t2 for that TOI is stopped.

When in the idle state 73, a transition 82 to the wait state 71 is made in response to receiving an FDT that contains one or more new TOIs. This causes the setting and starting of a fragment wait timer t1 for each new TOI, and the resetting of the object wait timer t3. A further transition 83 from the idle state 73 to the wait state 71 occurs when the first packet for a TOI which is not an FDT table is received. This causes the starting of a table wait timer t2 for that TOI.

If the state machine 70 is in the wait state 71 and the object wait timer t3 expires, a transition 84 to the error state 72 is made. This occurs only if there are one or more declared objects which have not yet been received. If in the wait state 51 any of the fragment wait timers t1 or any of the table wait timers t2 for any TOI expires, a transition 85 to the error state 72 is made.

When in the idle state 73 and on expiry of the object wait timer t3, a transition 86 is made to the session complete state 74. This is conditional on declared objects having been received. If the object wait time t3 expires and one or more declared objects have not been received, a transition 87 to the error state 72 is made instead.

The fragment wait time, table wait time and object wait time parameters may be signalled to the receiver 19 over-the-air. The use of signalled parameters is advantageous since it provides a server driven optimisation, i.e. the filecaster can modify the parameters according to the session contents. Signalling can occur in any suitable way. A number of examples follow.

The parameters may be signalled in LCT (Layered Coding Transport) extension headers. For example, all the parameters may be signalled within a single variable length LCT extension. Here, the LCT extension header may comprise, in sequence the following fields: HET (Header Extension Type); HEL (Header Extension Length); fragment wait time parameter; table wait time parameter; and object wait time parameter. The order of the fields is not important.

Alternatively, each parameter may be signalled in a respective, fixed length, LCT header extension. For example, there may be three header extensions, each including an HET field and a respective time parameter field.

Alternatively, the parameters may be signalled using any combination of these two options, for example using one fixed length header extension and two variable length header extensions.

Parameter signalling may instead be carried out using FDT extension fields, as one or more attributes in an FDT instance. With FLUTE, extension fields could be as follows:

```
<xs:attribute name="table_wait"
    type="xs:unsignedLong" use="optional"/>
<xs:attribute name="fragment_wait"
    type="xs:unsignedLong" use="optional"/>
<xs:attribute name="new_object"
    type="xs:unsignedLong" use="optional"/>
For example, an instance of this could be:
  <?xml version="1.0" encoding="UTF-8"?>
  <FDT-Instance xmlns:xsi="http://www.w3.org/2001/XMLSchema-
  instance"
  xmlns:fl="http://www.example.com/flute"
  xsi:schemaLocation="http://www.example.com/flute-fdt.xsd"
  Expires="2890842807"
  table_wait="100"
  fragment_wait="50"
  new_object="200">
    <File
      Content-Location="www.example.com/menu/tracklist.html"
      TOI="1"
      Content-Type="text/html"/>
    <File
      Content-Location="www.example.com/tracks/track1.mp3"
      TOI="2"
      Content-Length="6100"
      Content-Type="audio/mp3"
      Content-Encoding="gzip"
      Content-MD5="Eth76GlkJU45sghK"
      Some-Private-Extension-Tag="abc123"/>
  </FDT-Instance>
```

The parameters could instead be signalled as extension headers at any other protocol level, for example L2, IP, UDP, TCP or RTP.

The parameters may instead be carried by TOs, for example in (short) files. Any suitable format could be used, XML being an example, although any free text or data file could potentially be used. An example file is:

```
<start-of-file>
table_wait=100; fragment_wait=200; new_object=300
<end-of-file>
```

Alternatively, the parameters could be signalled out-of-band. One example of this uses a field of SDP (Session Description Protocol) description. Example fields follow:

a=fragment_wait:100 a=table_wait:200 a=new_object:300

Alternatively:

a=fragment_wait:100table_wait:200new_object:300

The above fields could either be session or media-level parameters.

Parameters signalled out-of-band can be fetched, or can be broadcasted on a separate channel.

The parameters may instead be embedded in an envelope, for example:

```
<file-envelope
   table_wait=100
   fragment_wait=200
   new_object=300
   <file-body
      ...the actual file data...
   </file-body>
</file-envelope>
```

One or more parameters may be preinstalled into the receiver, and the other parameters may be signalled, in any suitable way. This can reduce signalling overhead where one or more parameters is not changeable, but allow changeable parameters to be communicated to the receiver.

Many other modifications and variations of the described system are possible. For example whilst the invention has been described in relation to a mobile telecommunications handset, particularly a mobile telephone, it is applicable to other apparatus useable to receive files in delivery sessions. Transmission may be over-the-air, through DVB or other digital system. Transmission may instead be through a telephone or other wired connection to a fixed network, for example to a PC or server computer or other apparatus through an Internet multicast.

Although the embodiments are described in relation to IPDC over DVB-H, the invention can be applied to any system capable in supporting one-to-one (unicast), one-to-many (broadcast) or many-to-many (multicast) packet transport. Also, the bearer of the communication system may be natively unidirectional (such as DVB-T/S/C/H, DAB) or bi-directional (such as GPRS, UMTS, MBMS, BCMCS, WLAN, etc.). Data packets may be IPv4 or IPv6 packets, although the invention is not restricted to these packet types.

The invention claims is:

1. A receiver module comprising at least one of:
    a) a fragment wait timer configured to be started in response to the receiver module receiving a declaration referring to one or more objects;
    b) a new object wait timer configured to be started in response to detecting that all of one or more objects referred to in a declaration received by the receiver module have been received by the receiver module; and
    c) a table wait timer configured to be started in response to the receiver module receiving an object which is not referred to in any received declaration;
the receiver module being for receiving data transmitted in a file delivery session and being configured to leave the file delivery session in response to detecting the expiry of any of the one or more timers.

2. A receiver module as claimed in claim 1, in which the fragment wait timer is configured to be cancelled in response to the receiver module receiving the whole or at least a part of one of the one or more objects, or alternatively in response to the receiver module receiving the whole or at least a part of all of the one or more objects.

3. A receiver module as claimed in claim 2, including plural fragment wait timers, each fragment wait timer relating to a different one of the objects referred to in the declaration and being configured to be cancelled in response to the receiver module receiving the whole or at least a part of the associated object.

4. A receiver module as claimed in claim 1, in which the new object wait timer is configured to be cancelled in response to the receiver module receiving a further, different declaration.

5. A receiver module as claimed in claim 1, in which the table wait timer is configured to be cancelled in response to the receiver module receiving a declaration referring to that object.

6. A receiver module as claimed in claim 5, including plural table wait timers, each table wait timer relating to a different object which has been received by the receiver module and which is not referred to in any received declaration, each table wait timer being configured to be cancelled in response to the receiver module receiving the declaration referring to its associated object.

7. A receiver module as claimed in claim 1, in which the or each timer is configured to have a duration determined by a corresponding timer parameter.

8. A receiver module as claimed in claim 7, in which one or more timer parameters are permanently stored in the receiver module.

9. A receiver module as claimed in claim 7, in which one or more timer parameters are stored in the receiver module in an updatable manner.

10. A receiver module as claimed in claim 7, in which the receiver module is configured to receive one or more timer parameters as part of a signal received over a communications network.

11. A receiver module as claimed in claim 10, in which one or more timer parameters are received as part of a data packet.

12. A receiver module as claimed in claim 1, in which the receiver module is configured to receive packets, for example Internet Protocol packets, containing objects and declarations.

13. A receiver module as claimed in claim 1, in which the receiver module is configured to receive packets, for example Internet Protocol packets, containing objects, declarations, and one or more timer parameters.

14. A receiver module as claimed in claim 1, in which the receiver module is arranged in response to a timer expiring to determine a measure of the completeness, of reception of a file delivery session, to compare this to a threshold, and to leave the session approximately immediately or to leave the session after a significant period of time on the basis of the comparison.

15. A receiver module as claimed in claim 14, in which the significant period of time has a duration equal to less than one half of the expiry time of the timer or the shortest of the timers.

16. A receiver module as claimed in claim 1, in which the receiver module is arranged in response to a timer expiring to estimate a time in which the reception of the file delivery session is expected to be completed, to compare this to a threshold, and to leave the session approximately immediately or to leave the session after a significant period of time on the basis of the comparison.

17. A portable handheld device including a receiver module as claimed in claim 1.

18. A method comprising at least one of:
  a) starting a fragment wait timer in response to receiving a declaration relating to one or more objects;
  b) starting a new object wait timer in response to detecting that all of one or more objects referred to in a received declaration have been received; and
  c) starting a table wait timer in response to receiving an object which is not referred to in any received declaration;
the method bein method of receiving file delivery session further comprising leaving the file delivery session in response to detecting the expiry of any of the one or more timers;

19. A method according to claim 18, comprising cancelling the fragment wait timer in response to receiving the whole or at least a part of one of the one or more objects, or alternatively in response to receiving the whole or at least a part of all of the one or more objects.

20. A method according to claim 18, further comprising cancelling the new object wait timer in response to receiving a further declaration.

21. A method according to claim 18, further comprising cancelling the table wait timer in response to receiving a declaration referring to that object.

22. A network node operable to provide, for use by a receiver in respect of a file delivery session, at least one of a fragment wait timer parameter, relating to the maximum allowable time between receiving a table and receiving at least a first fragment of an object from that table, a new object wait timer parameter, relating to the maximum allowable time between all the objects for a table being received and a different table being received, and a table wait timer parameter, relating to the maximum allowable time between receiving an object not declared in a table that have been provided so far and receiving a table declaring the object not declared.

* * * * *

UNITED STATES PATENT AND TRADEMARK OFFICE
CERTIFICATE OF CORRECTION

| | | |
|---|---|---|
| PATENT NO. | : 7,865,161 B2 | Page 1 of 1 |
| APPLICATION NO. | : 11/628573 | |
| DATED | : January 4, 2011 | |
| INVENTOR(S) | : Toni Paila et al. | |

It is certified that error appears in the above-identified patent and that said Letters Patent is hereby corrected as shown below:

Claim 18, col. 17, line 23 delete "bein" and insert --being a--.

Claim 18, col. 17, line 23 insert --a-- in between "receiving" and "file".

Claim 18, col. 17, line 24 insert --and-- before "further".

Claim 18, col. 17, line 26 delete ";" and insert --.--.

Signed and Sealed this
Eighth Day of March, 2011

David J. Kappos
*Director of the United States Patent and Trademark Office*